United States Patent Office 2,962,418
Patented Nov. 29, 1960

2,962,418

TOXICANT CARRIER AND PESTICIDAL COMPOSITIONS CONTAINING SAME

Edgar W. Sawyer, Jr., Metuchen, N.J., assignor to Minerals & Chemicals Philipp Corporation, a corporation of Maryland No Drawing. Filed Nov. 4, 1957, Ser. No. 694,118

8 Claims. (Cl. 167—42)

This invention relates to a novel, particulate composition adapted to function as a carrier for a thiophosphate-type toxicant and to pesticidal compositions including the same.

Thiophosphate-type toxicants have the general structural formula:

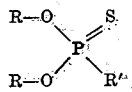

One of the most important members of this class of toxicants is Malathion, S-(1,2-dicarbethoxyethyl)-0,0-dimethyl dithiophosphate, in which R is $CH_3$ and R' is

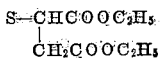

In Thiamet, R is $CH_3CH_2$ and R' is $S-C_2H_4-S-C_2H_5$; Parathion is closely related, R being $C_2H_5$ and R' being $OC_6H_4NO_2$. Thiophosphate-type toxicants of the structure set forth are widely used in agriculture because of their high kill and relatively high vapor pressure. It is frequently desirable to supply these toxicants as dry formulations, such as dusts, wettable powders and granular compositions, in which the toxicant is sorbed on the surface of a chemically inert particulate mineral carrier and is readily released thereby when the composition is applied to crops. Frequently these initial compositions are further diluted or "let-down" with low-sorptive particulate materials such as gypsum, talc and kaolinite or mixtures thereof. The desiderata of an ideal mineral carrier are: low cost, good flow properties, low bulk density, high sorptivity for the toxicant and negligible effect on the potency of the active ingredient impregnated thereon over prolonged storage of the composition. It has been found that some highly sorptive clays such as attapulgite (palygorskite), certain montmorillonite clays, mixtures of these clays, or mixtures of these clays with other clay minerals, such as kaolinitic clays, and kaolinite have a strong tendency to catalyze the decomposition of a thiophosphate-type toxicant sorbed on the clay surface whereby the resultant insecticidal compositions have only a short shelf life; after a few months of storage such compositions have inadequate insecticidal potency.

It is a primary object of the invention to teach a novel method to deactivate the surface of a sorptive clay so that a thiophosphate-type toxicant impregnated thereon has high stability and a prolonged storage life.

Another object of the invention is the preparation of stable particulate pesticidal compositions including a thiophosphate-type toxicant.

Other objects will be apparent from a reading of the following description of the invention.

In brief, my invention contemplates the addition of a novel additive to a sorptive clay to inhibit the tendency of that clay to catalyze the decomposition of a thiophosphate-type toxicant impregnated thereon.

More specifically, according to the teachings of the invention, a sorptive clay in powdered or granular state is treated with at least one non-fugitive unsaturated organic acid, preferably selected from the class of fatty acids and resin acids or mixtures thereof, in amount sufficient to prevent or substantially reduce the tendency of the carrier to catalyze the decomposition of the thiophosphate-type toxicant sorbed thereon. The unsaturated organic acid is preferably one that is in the liquid state at about 20° C., although an acid liquifiable below the temperature at which decomposition of the toxicant takes place, about 157° C. in the case of Malathion, may be used. The acid should preferably be in fluid state at the time of distribution on the carrier so that uniform distribution of relatively small quantities of the additive is feasible without recourse to the use of solvents. However, unsaturated acids that are in the solid or semi-solid state between about 20° C. and the decomposition temperature of the toxicant or higher may be used, their distribution on the carrier being facilitated by the employment of solvents. A further important requirement of the acid is that it have a low vapor pressure at room temperature; an acid or acid mixture boiling with or without decomposition at above about 80° C. at 760 mm. is satisfactory. In general unsaturated acids having from about 6 to 22 carbon atoms are suitable for the purpose. The acid or acid mixture may be added to the carrier prior to or simultaneously with the impregnation with the thiophosphate-type toxicant.

Although I do not wish to be bound by the hypothesis herein set forth, it is believed that the surface catalyzed decomposition of a thiophosphate-type toxicant is caused by the tendency of the carrier surface to promote both the oxidation of the double-bonded sulfur on the toxicant molecule and the hydrolysis of the P–S–C linkage, the latter mechanism of decomposition being particularly favored by the presence of water and calcium and/or metallic ions resident on the heterogeneous clay surface. Hence a tri-fold approach is herein made to counteract the tendency of the carrier surface to catalyze the decomposition of the toxicant sorbed thereon: (1) a material capable of being oxidized preferentially to the toxicant is added to the carrier to inhibit oxidative deterioration of said toxicant; (2) said material, being of an acidic character, tends to interact with available metallic ions, sequestering them in effect and decreasing the propensity of the metallic ions to catalyze hydrolysis of the P–S–C linkage; and (3) since the organic acid tends to react with the available metallic ions in situ said material acts as a barrier between the clay surface and sorbed material to prevent the deleterious action resulting from direct contact of the toxicant molecule with potentially destructive sites on the clay surface.

The unsaturated acids are preferably chosen from fatty acids having at least six carbon atoms and resin acids or admixtures thereof. Fatty acids are preferred to those olefinically unsaturated acids in which the double bond is positioned so as to exert an appreciable influence on the carboxy group. However, unsaturated fatty acids of the alpha-beta or beta-gamma types (preferably having at least six carbon atoms) may be used when they do not esterify the toxicants.

The presence of saturated acids, hydrocarbons of acid or neutral character, oxygenated organic compounds of acid or neutral character in the unsaturated acid or acids is not deleterious provided the material is not capable of oxidizing or reacting with (i.e., such as transesterification) the toxicant.

A preferred additive from the standpoint of economy is tall oil, either unrefined, refined or highly refined, tall oil being essentially a mixture of unsaturated fatty acids, principally oleic and linoleic acids, and resin acids. The composition of the resin acids in tall oil is essentially the same as that of the acid fractions of wood and gum rosins, that is, two double-bond abietic-type acids, about 59%; dihydro acids (abietic and pimaric-type) about 15%; tetrahydro acids (includes pimaric-type acids) about 18%; dihydroabietic acid, about 3%; oxidized acids, about 5%. Resin acids are classified into two groups, the abietic type and the pimaric type, both being characterized by the presence of two chemically reactive centers, the double bonds and the mono-carboxyl group and having theoretical iodine numbers of about 75. The double bonds of the two double-bond abietic-type acids are conjugated in the pimaric type, hence the pimaric acid type is more susceptible to oxidation. The melting points of the pure resin acids or isomeric mixtures is relatively high, that is, between about 150 and 213° C., hence to be useful for the purposes of the invention they must be applied to the carrier in a solvent or be used in conjunction with fatty acids such as, for example, in a tall oil, crude or refined tall oil.

It will be understood, however, that the unsaturated acid or mixture of acids useful in the practice of the invention is not restricted to tall oil or to specific unsaturated fatty acids therein or the resin acid to those specific ones in tall oil. Other suitable unsaturated fatty acids and properties thereof are tabulated below.

MONOETHENOID FATTY ACIDS

| Common Name | Synonyms | Theoret. Iodine Value |
|---|---|---|
| Obtusilic | 4-Decenoic | 149.10 |
| Carroleic | cis-9-Decenoic | 149.10 |
| 10-Undecylenic | 10-Undecenoic; 10-hen-decenoic | 128.01 |
| Lauroleic | cis-9-Dodecenoic | 128.01 |
| Physeteric | 5-Tetradecenoic | 112.15 |
| Myristoleic | cis-9-Tetradecenoic | 112.15 |
| Palmitoleic | cis-9-Hexadecenoic | 99.78 |
| Petroselinic | cis-6-Octadecenoic | 89.87 |
| Petroselaidic | trans-6-Octadecenoic | 89.87 |
| Oleic | cis-9-Octadecenoic | 89.87 |
| Elaidic | trans-9-Octadecenoic | 89.87 |
| Vaccenic | trans-11-Octadecenoic | 89.87 |
| Erucic | cis-13-Docosenoic | 74.98 |
| Brassidic | trans-13-Docosenoic | 74.98 |

DI-, TRI-, AND OTHER POLYETHENOID FATTY ACIDS

| Common Name | Synonyms | Theoret. Iodine Value |
|---|---|---|
| Sorbic | 2, 4-Hexadienoic | 226.39 |
| Linoleic | cis-9, cis-12-Octadecadienoic; linolic | 181.03 |
| Linolelaidic | trans-9, trans-12-Octadecadienoic | 181.03 |
| Hiragonic | 6, 10, 14-Hexadecatrienoic | 304.16 |
| α-Eleostearic | cis-9, cis-11, trans-13 Octadecatrienoic (?) | 273.51 |
| β-Eleostearic | trans-9, cis-11, cis-13 Octadecatrienoic (?) | 273.51 |
| Punicic | 9, 11, 13-Octadecatrienoic | 273.51 |
| Linolenic | cis-9, cis-12, cis-15 Octadecatrienoic | 273.51 |
| Elaidolinolenic | trans-9, trans-12, trans-15 Octadecatrienoic (?) | 273.51 |
| Pseudoeleostearic | trans-10, trans-12, trans-14 Octadecatrienoic | 273.51 |
| α-Parinaric | 9, 11, 13, 15-Octadecatetraenoic | 367.34 |
| β-Parinaric | 9, 11, 13, 15-Octadecatetraenoic | 367.34 |
| Arachidonic | 5, 8, 11, 14-Eicostatetraenoic | 333.50 |

The unsaturated fatty acids may be supplied as the pure acids or as mixtures, usually in association with fatty acids, derived from the hydrolysis of oils of vegetable or animal or marine origin. For example commercial-grade oleic acid, so-called "red oil" is made from inedible tallow or grease and usually contains up to about 75% oleic acid and the balance about equal parts of linoleic and the saturated acids, palmitic and stearic. Other technical grades of oleic acid are available, these materials being characterized by the elimination of poly unsaturated acids.

The presence of an antioxidant in the acid in amount of from about 0.1 to about 3%, based on the weight of the unsaturated acid, is desirable particularly where the acid or a substantial portion of the acid mixture is a polyethenoid type. When the acid or acid mixture is of vegetable origin, sufficient naturally-occurring phenolic-type antioxidant, an inhibitol, such as sterol, tocopherol, etc., is present so that no anti-oxidant need be added. However, animal fatty acids, particularly those high in polyethenoid constituents, are benefited by addition thereto of from about 0.01 to 3%, and preferably about 0.1 to 0.5% of an antioxidant which may be an inhibitol. If desired commercially available antioxidants such as hindered phenols, etc., may be added to increase the inhibitor level. These would be limited to compounds which have no deleterious effect on the phosphate-type toxicants.

A suitable fatty acid mixture derived from animal fat has a titer of 32.2 to 40° C., an iodine value (Wijs) of 65-85, a free oleic acid content of 90-96%, and an acid value (mg. KOH) of 179-191. Useful fatty acid mixtures are derived from cottonseed oil, soya oil, corn oil, palm oil, and many other oils. A particularly useful liquid fatty acid has a maximum titer of 50° C., an iodine value (Wijs) of from 135-145, an acid value of 195-201; the acid mixture analyzes about 40% oleic acid, about 55% linoleic acid, and about 2% linolenic acid. A suitable fatty acid mixture derived from soya oil has a titer of 18-23° C., iodine value of 120-125 (Wijs), acid value of 193-201, and analyzes about 38% oleic acid, 43% linoleic acid, 2% linolenic acid and about 9% saturated acids.

A typical commercially available oleic acid has a titer of about 5° C., an iodine value of 90-93 (Wijs), a saponification value of 195-203, and a typical composition of 79% oleic acid, 10% linoleic acid, 1% linolenic acid, 4% myristic acid, 5% palmitic acid, and about 1% stearic acid.

Some suitable tall oil compositions and physical data are tabulated below:

| | Whole Tall Oil | Tall Oil Pitch | Tall Oil Crude | Tall Oil Low Resin | Tall Oil Fatty Acid |
|---|---|---|---|---|---|
| Acid No | 158-168 | 55-75 | 160-168 | 188-193 | 192-195 |
| Iodine (Modified Wijs) | 190-210 | 115-135 | 170-180 | 155-165 | 170-180 |
| Analyses: | | | | | |
| Fatty Acids, percent | 47-57 | 35-50 | 44-54 | 70-66 | 96-98 |
| Rosin Acids, percent | 37-42 | 24-32 | 40-50 | 28-32 | 1.5-2.5 |
| Sterols, Higher Alcohols, etc., 1% | 6-9 | 22-32 | 6-9 | 1.5-2.2 | 1.5-2.5 |

It is very important that the components of the deactivator be very thoroughly admixed with the carrier so that no destructive sites on the carrier surface are available to promote the deterioration of the toxicant. Particularly when very small quantities of deactivator are used it may be desirable to add a solvent for the deactivator additives to ensure their thorough distribution on the clay surface.

The practices taught herein are particularly beneficial when applied to attapulgite clay, whose high sorptivity, low bulk density, superior flow characteristics, low price and ability to readily release sorbed material, make it a highly desirable carrier for a thiophosphate-type toxicant when the tendency of the material to catalyze the decomposition of the toxicant sorbed thereon is minimized. The practices herein taught may be beneficially applied to certain montmorillonite clays.

The clays may be deactivated by any milling technique which insures adequate distribution and substantial homogeneity of the components of the pesticidal composition or the deactivated carrier, such techniques being well known to those skilled in the art. A solvent may be added to the components of the deactivator to ensure the adequate distribution of the deactivator on the carrier. The Malathion or other thiophosphate-type toxicant may be impregnated on the carrier by milling, spraying, or solvent spraying techniques. Alternatively, the Malathion may be added to the carrier together with the deactivator and be milled together.

The following examples and accompanying description are given only for the purpose of better illustrating the invention and are not to be construed as limiting the scope thereof.

Samples of attapulgite clay deactivated by the practice of the instant invention were impregnated with about 5 percent by weight of a technical grade of Malathion, and the chemical stability of the sorbed toxicant of each sample was tested.

The clay used was Attaclay, a finely powdered grade of fuller's earth made and sold by Minerals and Chemicals Corporation of America and having the following specifications:

*Typical chemical composition (volatile-free basis)*

| | | |
|---|---|---|
| $SiO_2$ | percent | 67.0 |
| $Al_2O_3$ | do | 12.5 |
| MgO | do | 11.0 |
| $Fe_2O_3$ | do | 4.0 |
| CaO | do | 2.5 |
| Others | do | 3.0 |
| Average particle size (microns) | | 18 |
| Oil absorption (ASTM D281-31) | | 99 |
| Free moisture content (as produced) — wt. percent determined at 220° F. until constant weight is achieved. | | 0.2 |
| pH (of water slurry) | | 7.0–8.0 |
| Bulk density (lbs./cu. ft.) | | 27–31 |

The samples were formulated by dripping the Malathion and fluid deactivator solution on the clay while mixing in a Hobart mixer and then blending in the mixer for an additional 20 minutes. Each sample was then passed twice through a hammer mill and post-blended on a roller-mill. The pesticidal dust compositions thus formulated were subjected to an accelerated decomposition test by subjecting each sample in a sealed jar to a temperature of 40° C. for a month to accelerate any breakdown tendency of the toxicant during the storage period. While a compound may be unstable at 40° C., it may, nevertheless display good stability characteristics at room temperature. It has been observed that the results of such accelerated tests conducted to determine the stability of toxicants sorbed on a mineral carrier, such as Attaclay, correspond to the stability data for like compositions during storage for much longer periods of time at room temperature. At the end of the storage period during which the Malathion compositions were held in sealed jars at about 40° C. for the purpose of studying the stability of the toxicant under the test conditions, the residual Malathion concentration was ascertained by a method to be described and was recorded as the percentage of Malathion chemically decomposed during the storage period. It has been found that Malathion, impregnated on a sample of untreated Attaclay, at the 5% level, has a decomposition percentage of about 70 percent under the test conditions above described.

The determination of Malathion was made by the so-called "Carbon Tetrachloride Method," a colorimetric analytical procedure for the quantitative analysis of technical grade Malathion. Malathion, S-(1,2-dicarbethoxyethyl)-0,0-dimethyl dithiophosphate, is decomposed by alkali in carbon tetrachloride-ethanol solution to 0,0-dimethyl dithiophosphate, sodium fumarate and ethanol. The sodium 0,0-dimethyl dithiophosphate is then converted to the cupric complex which is soluble in carbon tetrachloride with the formation of an intense yellow color. The color intensity is proportional to the concentration of 0,0-dimethyl dithiophosphoric acid and is measured colorimetrically at 418 mu, the absorption peak. The corresponding amount of insecticide is then ascertained by comparison with a standard curve prepared from known amounts of pure insecticide carried through the procedure. In the method dilute alkaline and acid washes are used to remove materials which would reduce cupric ions to cuprous ions. With dithiophosphoric acids cuprous ions form a colorless complex which is more stable than the yellow cuproic complex.

To prepare the standard curve for Malathion dissolve approximately 0.25 g. (weighed to 0.1 mg.) of pure Malathion in 2-B ethanol contained in a 250 ml. volumetric flask. Dilute to the mark with 2-B ethanol. Mix well, transfer a 25 ml. aliquot to a second 250 ml. volumetric flask, and dilute to the mark with 2-B ethanol. One ml. of this solution is equivalent to 0.1 mg. of Malathion. Carry 0, 2.5, 5, 10, 15, 20 and 25 ml. aliquots of the standard solution through the following procedure.

Transfer each aliquot to a 250 ml. separatory funnel containing sufficient 2-B ethanol to make a total volume of exactly 25 ml. of ethanol. Add 1 ml. of 1% $CS_2$ in 90 ml. of carbon tetrachloride. Mix well by swirling gently. Add 75 ml. of 2% MaCl solution (cooled to 15 C.), containing 1 ml. of 0.1 N NaOH and shake vigorously for exactly 1 minute. Allow the layers to separate and draw off the carbon tetrachloride layer into a clean, dry 250 ml. separatory funnel. Wash the aqueous layer once with 10 ml. of carbon tetrachloride by shaking for 15 seconds, allow the phases to separate and add the carbon tetrachloride layer to the main carbon tetrachloride solution, making certain that no water is transferred to the separatory funnel containing the carbon tetrachloride layers. Discard the alkaline salt solution.

Add 25 ml. of 2-B ethanol to the carbon tetrachloride extract and swirl to mix. Add 1 ml. of 6 N NaOH and shake exactly 1 minute. Immediately add 75 ml. of 2% NaCl solution (cooled to 15 C.) and shake for exactly 1 minute. Allow the phases to separate and discard the carbon tetrachloride layer. Wash the aqueous solution with 25 ml. of carbon tetrachloride by shaking for 30 seconds. Discard the carbon tetrachloride layer.

Add 25 ml. of carbon tetrachloride and 1 ml. of 7 N HCl to the aqueous layer and shake for 30 seconds. Allow the phases to separate and discard the carbon tetrachloride layer. Wash the aqueous solution with 25 ml. of carbon tetrachloride by shaking for 30 seconds. Drain off the carbon tetrachloride as completely as possible and discard.

To the aqueous phase remaining in the separatory funnel add from a pipette 50 ml. of carbon tetrachloride and then 2 ml. of copper sulfate solution. Immediately shake for 1 minute and allow the phases to separate. Immediately measure the absorbance of the yellow solution of 420 mu using carbon tetrachloride as the reference.

Prepare the standard curve by plotting the absorbance of each of the above aliquot vs. the mg. of Malathion.

To analyze the powders containing Malathion, a sample is weighed to the nearest milligram into a volumetric flask and diluted to the mark with 2-B ethanol. Serial dilutions are made so that the final amount of Malathion analyzed is 1.0 to 1.5 mg.

Samples of pesticidal compositions containing about 5 percent by weight of Malathion were chosen for observation since absolute decomposition, based on the original weight of Malathion present would show up better than if observations were made on a higher concentration powder, such as 25 percent Malathion. On an absolute basis, decomposition should be substantially identical for 5 percent and 25 percent Malathion formulations. It is to be clearly understood that a 5 percent Malathion concentration was chosen merely to magnify decomposition effects and not to restrict the scope of the invention to such a composition. An inexpensive, inactive, relatively non-sorptive carrier may be added to formulations to produce field strength compositions.

EXAMPLE 1

The ability of several grades of tall oil to reduce the tendency of Attaclay to decompose a thiophosphate-type toxicant, Malathion, is demonstrated. Attaclay was simultaneously impregnated with 5.2% by weight of a technical grade of Malathion and several commercially available liquid grades of tall oils, in varying quantities. In the case of tall oil sample B, a highly viscous composition, the Malathion was admixed with the oil and the resultant mass impregnated on the carrier. All samples were held in sealed jars at 40° C. for one month. The composition and physical properties of the tall oil samples are as follows:

| General Type, 0.1 | A Whole Tall Oil | B Whole Tall Oil | C Distilled Tall Oil | D High Fatty Acid Tall Oil | E High Rosin Acid Tall Oil | F Whole Tall Oil |
|---|---|---|---|---|---|---|
| Acid No | 180-185 | 155-168 | 188-193 | 192-195 | 160-170 | 160-168 |
| Saponification No | 181-186 | 163-173 | 190-195 | 195-198 | 168-178 | 165-175 |
| Rosin Acids, percent | 30-33 | 37-42 | 28-32 | 0.8-1.2 | q.s. | 40-50 |
| Fatty Acids, percent | 61-66 | 47-57 | 70-66 | 96-98 Linoleic 48% Oleic 50% Sat. 2% | 0-3 | 44-54 |
| Unsaponifiables (Sterols, Higher Alcohols, etc.) | 4-6 | 6-9 | 1.5-2.2 | 1.5-2.5 | 4.5-7.0 | 6-9 |
| Iodine No. (Wijs) | 170-180 | 190-210 | 155-165 | 127-133 | | 170-180 |
| Moisture, percent | 0.1 Max. | 0.1.0 | None | None | | 0.2-1 |
| Viscosity, SUS @ 210 F | 42-62 | 85-110 | 54 | 93 | | 90-120 |

Modified Wijs using 300±10% excess iodine at 25±0.5° C. for 30 minutes.
Except as noted, methods are according to ASTM D803-44T.

The results of impregnating the Attaclay with portions of the above oils are tabulated below:

| Tall Oil | Percent Tall Oil | Percent Decomposition |
|---|---|---|
| None | | 70.0 |
| Oil A | 5 | 25.0 |
| Oil A | 10 | 17.3 |
| Oil B | 5 | 40.3 |
| Oil B | 10 | 25.1 |
| Oil B and 5% Kerosene | 5 | 31.5 |
| Oil C | 5 | 24.2 |
| Oil D | 5 | 21.5 |
| Oil E | 5 | 29.4 |
| Oil F | 5 | 26.0 |

It will be understood that the invention is susceptible to numerous embodiments without departing from the spirit and scope thereof and, therefore, only such limitations should be imposed as are indicated in the appended claims:

I claim:

1. A carrier for a thiophosphate-type toxicant in solid particulate form comprising a sorptive naturally occurring siliceous mineral having distributed on the surface thereof at least one unsaturated organic acid in an amount of from about 5% to about 10% by weight based on the weight of said siliceous mineral, said unsaturated organic acid being selected from the group consisting of unsaturated fatty acids and resin acids having from about 6 to 22 carbon atoms and having an Iodine Number of at least about 70.

2. The carrier of claim 1 in which the siliceous mineral is attapulgite.

3. The carrier of claim 1 in which the siliceous mineral is montmorillonite.

4. A pesticidal composition in solid particulate form comprising a sorptive naturally occurring siliceous mineral having distributed on the surface thereof a thiophosphate-type toxicant and at least one unsaturated organic acid selected from the group consisting of unsaturated fatty acids and resin acids having from about 6 to 22 carbon atoms and having an Iodine Number of at least about 70, said unsaturated organic acid being present in an amount of from about 5% to about 10% by weight based on the weight of said siliceous mineral.

5. The pesticidal composition of claim 4 in which the siliceous mineral is attapulgite.

6. The pesticidal composition of claim 4 in which the siliceous mineral is montmorillonite.

7. A pesticidal composition in solid particulate form comprising attapulgite having distributed on the surface thereof Malathion and at least one unsaturated organic acid selected from the group consisting of unsaturated fatty acids and resin acids having from about 6 to 22 carbon atoms and having an Iodine Number of at least about 70, said organic acid being present in an amount of from about 5% to about 10% by weight based on the weight of said attapulgite.

8. A pesticidal composition in solid particulate form comprising attapulgite having distributed on the surface thereof parathion and at least one unsaturated organic acid selected from the group consisting of unsaturated fatty acids and resin acids having from about 6 to 22 carbon atoms and having an Iodine Number of at least about 70, said organic acid being present in an amount of from about 5% to about 10% by weight based on the weight of said attapulgite.

References Cited in the file of this patent

UNITED STATES PATENTS

Re. 22,340    Dolman    July 6, 1943
1,890,158    Lindstaedt    Dec. 6, 1932

OTHER REFERENCES

Yost: "Malathion Formulations," Agr. Chem., October 1955, pp. 105, 107, 44-44.